(12) United States Patent  
Chen

(10) Patent No.: US 8,059,941 B2
(45) Date of Patent: Nov. 15, 2011

(54) MULTIPLEX DVD PLAYER

(75) Inventor: Max Chen, Taipei (TW)

(73) Assignee: Via Technologies Inc., Taipei (TW)

( * ) Notice: Subject to any disclaimer, the term of this patent is extended or adjusted under 35 U.S.C. 154(b) by 1154 days.

(21) Appl. No.: 11/104,263

(22) Filed: Apr. 12, 2005

(65) Prior Publication Data

US 2005/0259977 A1    Nov. 24, 2005

(30) Foreign Application Priority Data

May 10, 2004   (TW) ............................... 93113049 A

(51) Int. Cl.
| | |
|---|---|
| H04N 5/84 | (2006.01) |
| H04N 5/78 | (2006.01) |
| H04N 5/928 | (2006.01) |
| H04N 7/167 | (2011.01) |
| H04N 7/173 | (2011.01) |
| H04N 9/80 | (2006.01) |
| G06F 13/00 | (2006.01) |
| G06F 17/00 | (2006.01) |
| G10L 19/00 | (2006.01) |
| H04B 1/00 | (2006.01) |
| H04B 1/66 | (2006.01) |

(52) U.S. Cl. ........ 386/334; 386/252; 386/338; 380/201; 455/45; 455/102; 463/43; 704/201; 725/55; 725/106; 725/122

(58) Field of Classification Search ................. 386/125, 386/95, 96, 126, E5.053, E9.04, E9.041, 386/94, E5.064, E5.001; 348/E5.099, E5.108, 348/E7.035, E7.061, E7.071, E7.081; 463/43; 704/201; 725/55, 106, 122; 380/201; 455/45, 455/102

See application file for complete search history.

(56) References Cited

U.S. PATENT DOCUMENTS

| | | | |
|---|---|---|---|
| 4,866,515 A |  | 9/1989 | Tagawa et al. |
| 6,104,861 A | * | 8/2000 | Tsukagoshi ..................... 386/95 |
| 6,728,477 B1 | * | 4/2004 | Watkins ......................... 386/125 |
| 2002/0086734 A1 | * | 7/2002 | Krishnan et al. ................ 463/43 |
| 2003/0041332 A1 | * | 2/2003 | Allen et al. .................... 725/106 |
| 2003/0125933 A1 | * | 7/2003 | Saunders et al. .............. 704/201 |
| 2003/0188312 A1 | * | 10/2003 | Bae et al. ......................... 725/55 |
| 2004/0264927 A1 | * | 12/2004 | Evans et al. ...................... 386/94 |
| 2006/0063490 A1 | * | 3/2006 | Bader et al. ...................... 455/45 |

FOREIGN PATENT DOCUMENTS

| | | |
|---|---|---|
| CN | 1205794 | 1/1999 |
| CN | 1270752 | 10/2000 |
| JP | 11-055628 | 2/1999 |

OTHER PUBLICATIONS

China Office Action mailed Sep. 15, 2006. (No English Translation.).

* cited by examiner

Primary Examiner — Thai Tran
Assistant Examiner — Syed Y Hasan
(74) Attorney, Agent, or Firm — Thomas, Kayden, Horstemeyer & Risley, LLP

(57) ABSTRACT

A method for playing DVD. A method for simultaneously outputting a DVD movie to multiple channels each having its own playback parameters such as view angle, spoken language and subtitle language, using a single DVD player.

6 Claims, 7 Drawing Sheets

MULTIPLEX DVD PLAYER

BACKGROUND

The invention is related to a method of DVD play, and in particular, to a method of simultaneously outputting a DVD movie stream to multiple channels of one DVD player each comprising individual playback parameters.

According to digital versatile disc (DVD) specifications, a disc may provide a movie with support for several languages, thus various playback parameters, such as a subtitle language, a spoken language and a view angle may be selected as desired. Although various options are provided, only one option can be implemented per viewing. That is to say, no more than one subtitle language, one spoken language and one view angle can be implemented at one time.

Conventional implementation of DVD options on a per viewing basis are adequate for general use, however, certain environments may require additional functionality. Such environments may include a plane, bus or Karaoke bar. Typically, a DVD player can play one DVD with specific playback parameters, thus, no all audiences requiring various native languages or preferring different view angles will be satisfied. If multiple DVD players, however, are provided to meet various requirements, cost is increased.

SUMMARY

An embodiment of the invention provides a method for synchronous output of multiple channels from one DVD player, wherein each channel comprises at least a selectable parameter, the method comprises the following steps. First, a plurality of channels are provided, each corresponding to a display. Parameter selections are received from each channel. Selected streams are generated by converting an original stream according to each selected parameter. Each selected stream is output on the corresponding display through channels from which the selected parameters are originated.

The original stream is obtained from a DVD. The parameter comprises a video option for selecting view angles, an audio option for selecting spoken languages, and a subtitle option for selecting subtitle languages.

The original stream comprises a video stream comprising video sub-streams of different view angles, an audio stream comprising audio sub-streams of various languages, and a subtitle stream comprising subtitle sub-streams of various languages.

The generating step comprises the following steps. The original stream are decrypted into the video stream, the audio stream and the subtitle stream. The video stream is decoded into video sub-streams, the audio stream into audio sub-streams, and the subtitle stream into subtitle sub-streams. A selected stream is generated through combination of one of the video sub-streams, one the audio sub-streams and one of the subtitle sub-streams according to the selected parameters.

Another embodiment of the invention provides a multiplex DVD player for simultaneously playing a DVD over multi channels each having at least a playback parameter, an option selector for receiving selected playback parameters, and a multiplexer for synchronous outputting a plurality of selections from an original stream to the corresponding channels where the selections are originated.

The multiplex DVD player further comprises a DVD reader for reading the original stream from a DVD, a decoder for decrypting the original stream to obtain the following data: a video stream comprising video sub-streams of different view angles, an audio stream comprising audio sub-streams of various languages, and a subtitle stream comprising subtitle sub-streams of various languages. The multiplex DVD player also comprises a video decoder for decoding the video stream into video sub-streams, an audio decoder for decoding the audio stream into audio sub-streams, and a subtitle decoder for decoding the subtitle stream to obtain the subtitle sub-streams.

BRIEF DESCRIPTION OF THE DRAWINGS

The following detailed description, given by way of example and not intended to limit the invention solely to the embodiments described herein, will best be understood in conjunction with the accompanying drawings, wherein.

DETAILED DESCRIPTION OF THE INVENTION

A detailed description of an embodiment of the invention is provided in the following.

Figure 1:
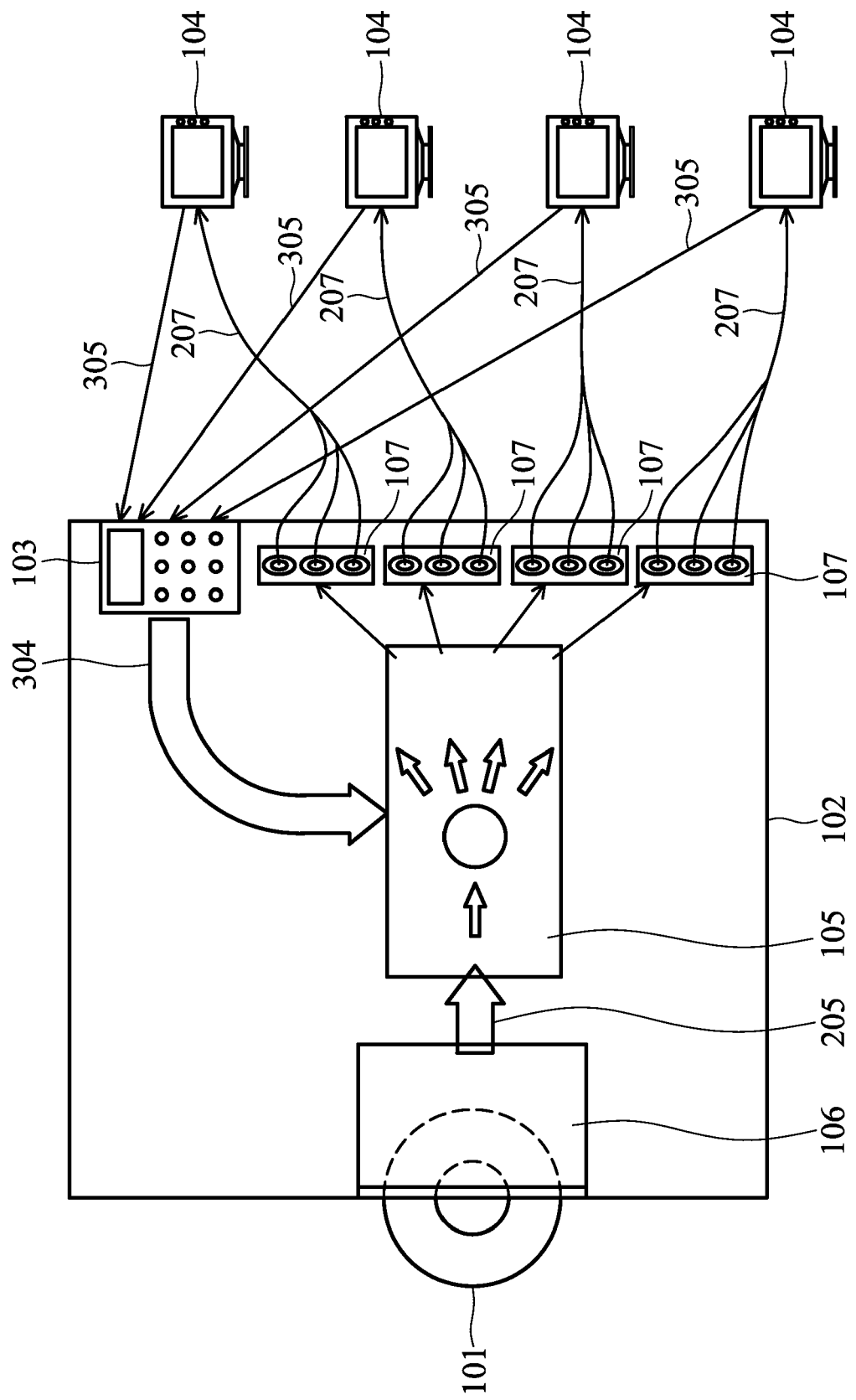
FIG. 1 shows a multiplex DVD player according to embodiments of the invention.

FIG. 1 shows a DVD player 102 according to an embodiment of the invention. In DVD player 102, an original stream 205 is obtained by reading a DVD 101 through a DVD reader 106. The stream is then processed in a multiplexer 105 to generate a plurality of output streams 207. Each output stream 207 is output through a corresponding output interface 107 and is transmitted to a corresponding client terminal 104 for presentation. Each client terminal 104 provides a set of playback parameters 305 for determining the received output stream 207. The playback parameters 305 are entered to the DVD player 102 via a selection panel 103. The selection panel 103 outputs the collected playback parameters 304 to control the multiplexer 105 and thereby the output streams 207 are generated individually.

The DVD 101 can be an optical storage media conforming to the digital versatile disc (DVD) format.

After processing in the multiplexer 105, each output stream 207 can comprise the same or different data, depending on the language, subtitle, and view angle playback parameters (contained in 304) entered via the selection panel 103, for display on the client terminal 104.

Synchronous output of multiple output streams 207, via multiple output interfaces 107, regardless of the selected playback parameters 304, corresponding to each stream, can be achieved as only one DVD player 102 is employed.

Figure 2:
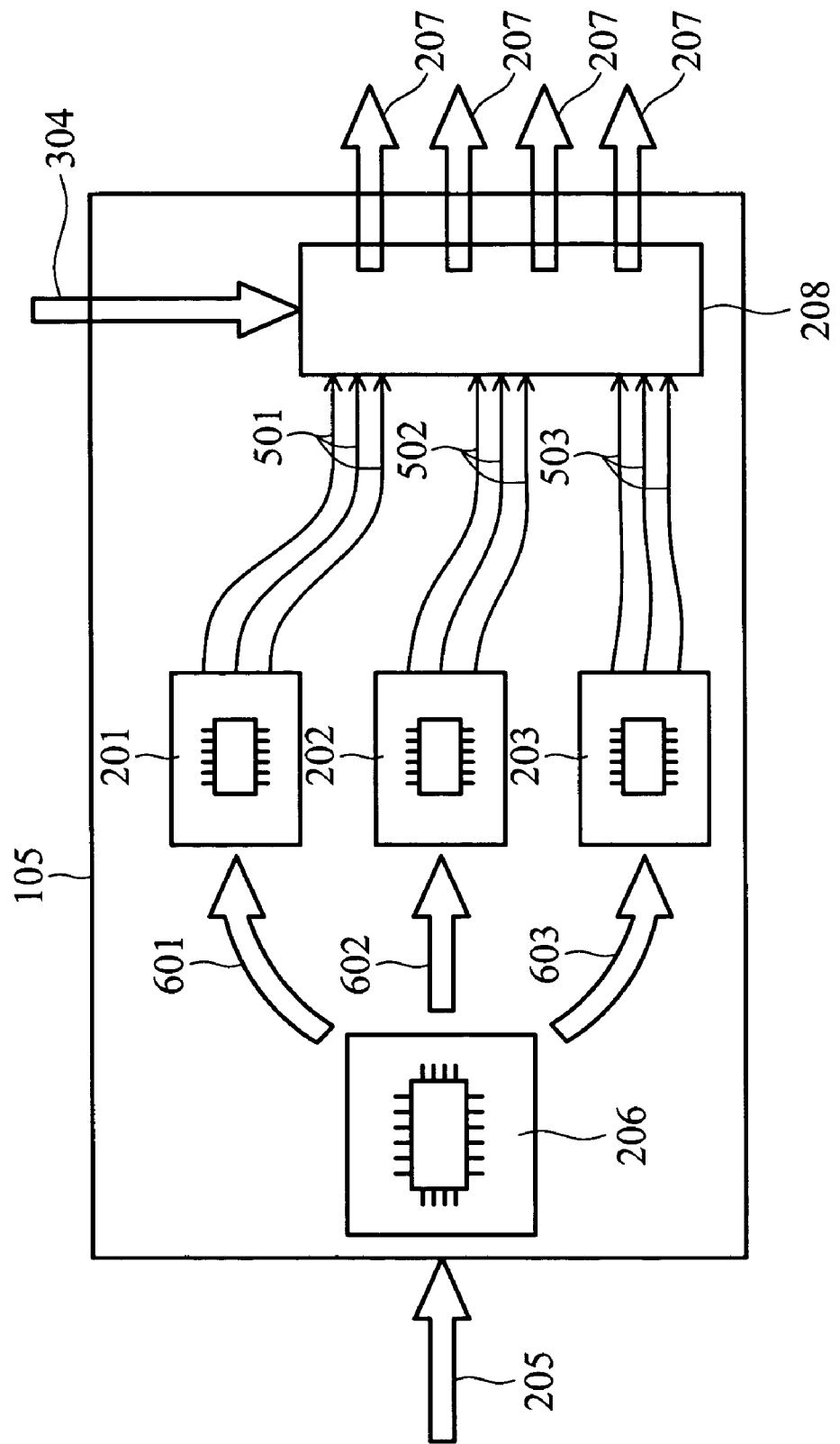
FIG. 2 is a diagram of a multiplexer according to an embodiment of the invention.

FIG. 2 is a detailed diagram of multiplexer 105, wherein the original stream 205 is received by a stream engine 206 and decrypted to video stream 601, audio stream 602 and subtitle stream 603 which are further decoded to video sub-stream 501, audio sub-stream 502 and subtitle sub-stream 503 through video decoder 201, audio decoder 202 and subtitle decoder 203. In multiplexer 208, the playback parameters 304 are input and the output streams 207 are accordingly generated through recombination of video sub-stream 501, audio sub-stream 502 and subtitle sub-stream 503.

Figure 3:
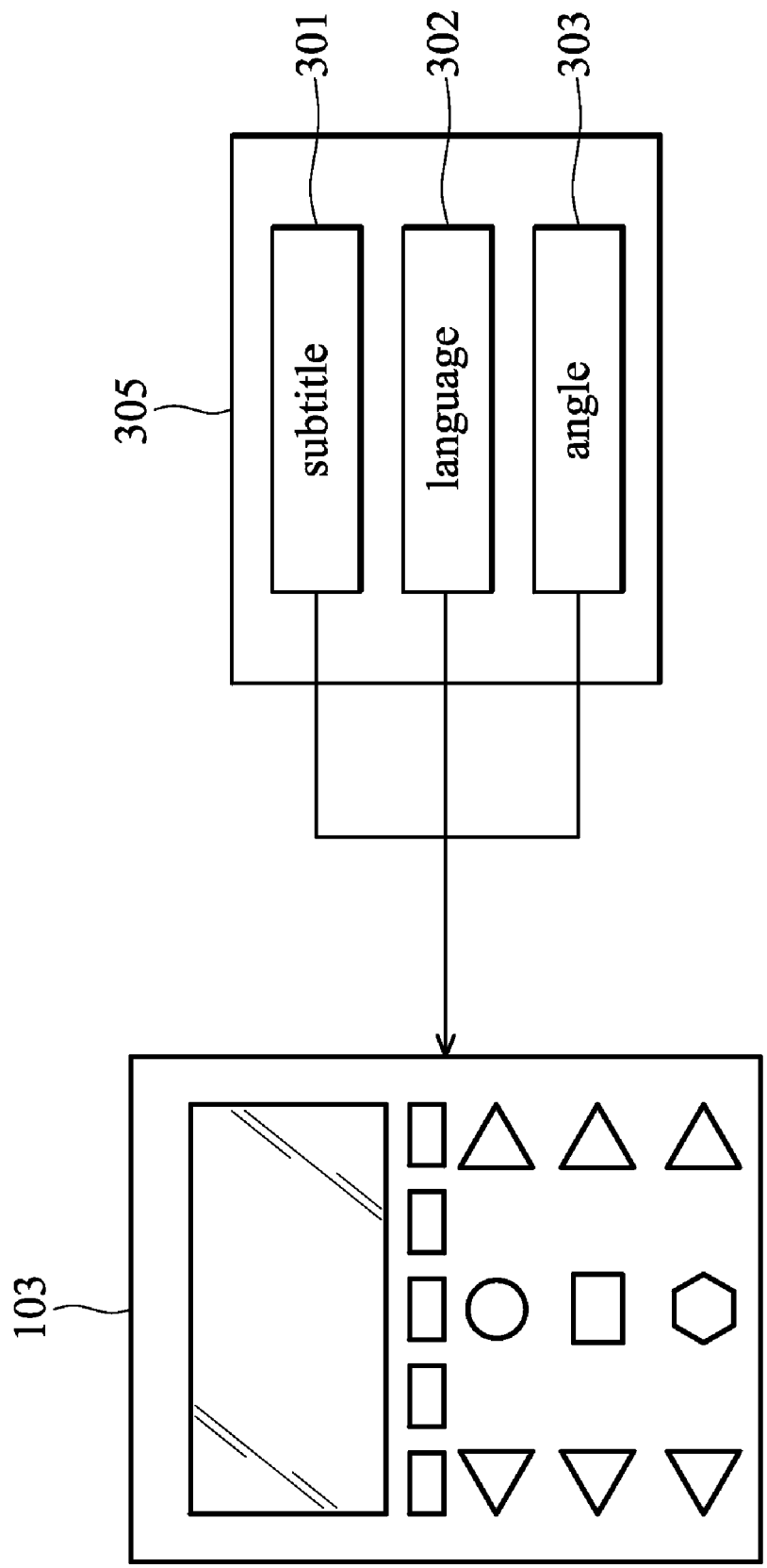
FIG. 3 shows an option selector and the data structure of the parameter according to an embodiment of the invention.
Figure 4:
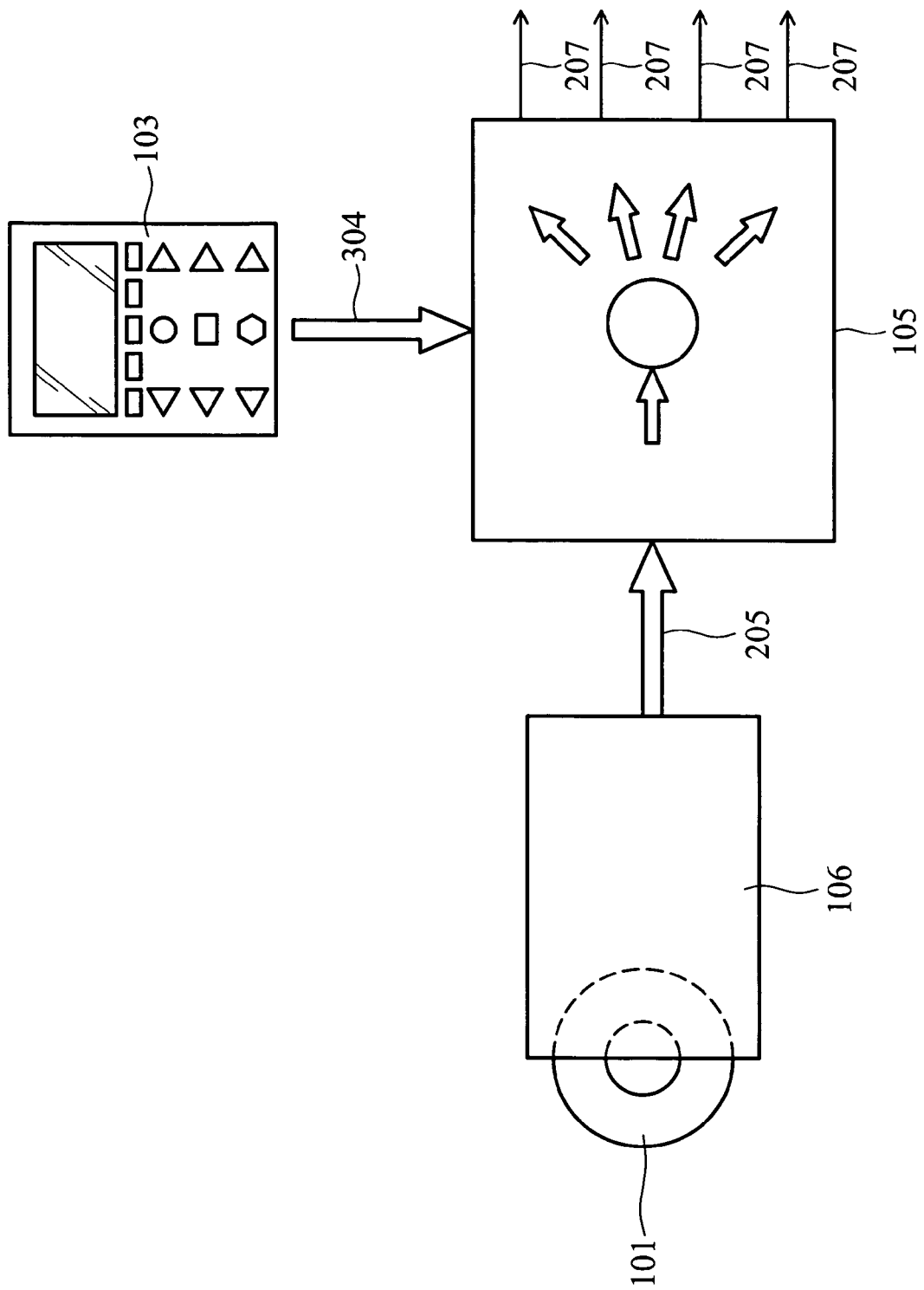
FIG. 4 is a flowchart showing DVD playback.

The sets of playback parameters 305 can be input via remote control. In an embodiment of the invention shown in FIG. 3, the selection panel 103 comprises a panel for each client terminal 104 for entering the set of playback parameters 305 corresponding thereto. Each output stream 207 corresponds to one set of playback parameters 305. One set of playback parameters 305 comprises subtitle selection 301, speech selection 302 and view angle selection 303, but is not limited thereto, instead, highly personalized features may be provided to improve playback quality, such as brightness, screen ratio (3:4 or 9:16), volume effects (mono, stereo or surround) and the like.

Figure 6:
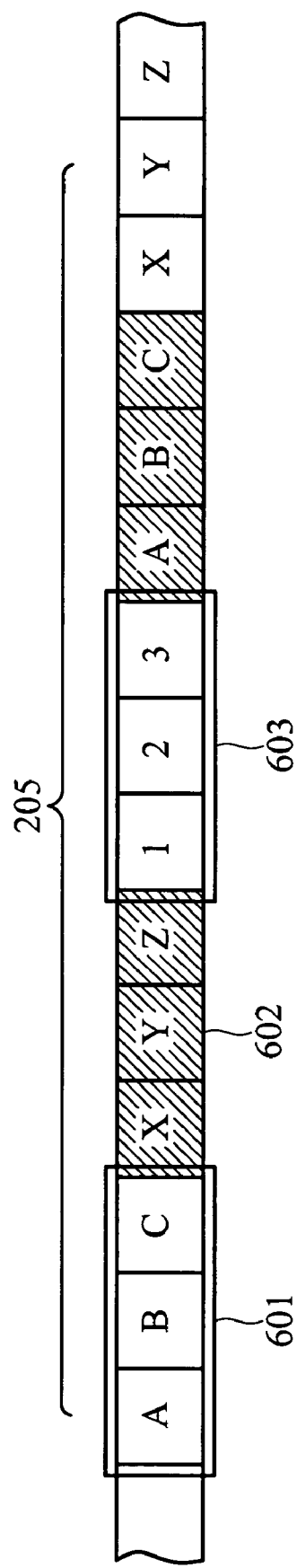
FIG. 6 shows a DVD stream embodiment.

FIG. 6 shows a DVD data structure. An original stream 205 comprises digital content of various data types, such as video stream 601, audio stream 602 and subtitle stream 603, which are interleaved and repeated periodically. The physical positions of video stream 601, audio stream 602 and subtitle stream 603 in the DVD are precisely represented as "ABC", "XYZ" and "123" in FIG. 6. Therefore, the DVD player 102 reads the original stream 205 as a consecutive digital chain. The mechanism for decoding the chain is described in the following. The video stream 601 comprises a plurality of video sub-streams 501, the audio stream 602 comprises a plurality of audio sub-streams 502, and the subtitle stream 603 comprises a plurality of subtitle sub-streams 503. All the streams are further decoded into a plurality of sub-streams. Similarly, when "ABC" (video stream 601) is decoded from the chain "ABCXYZ123" (original stream 205), it is further decoded to obtain "A" "B" and "C", as video sub-stream 501.

Figure 5A:
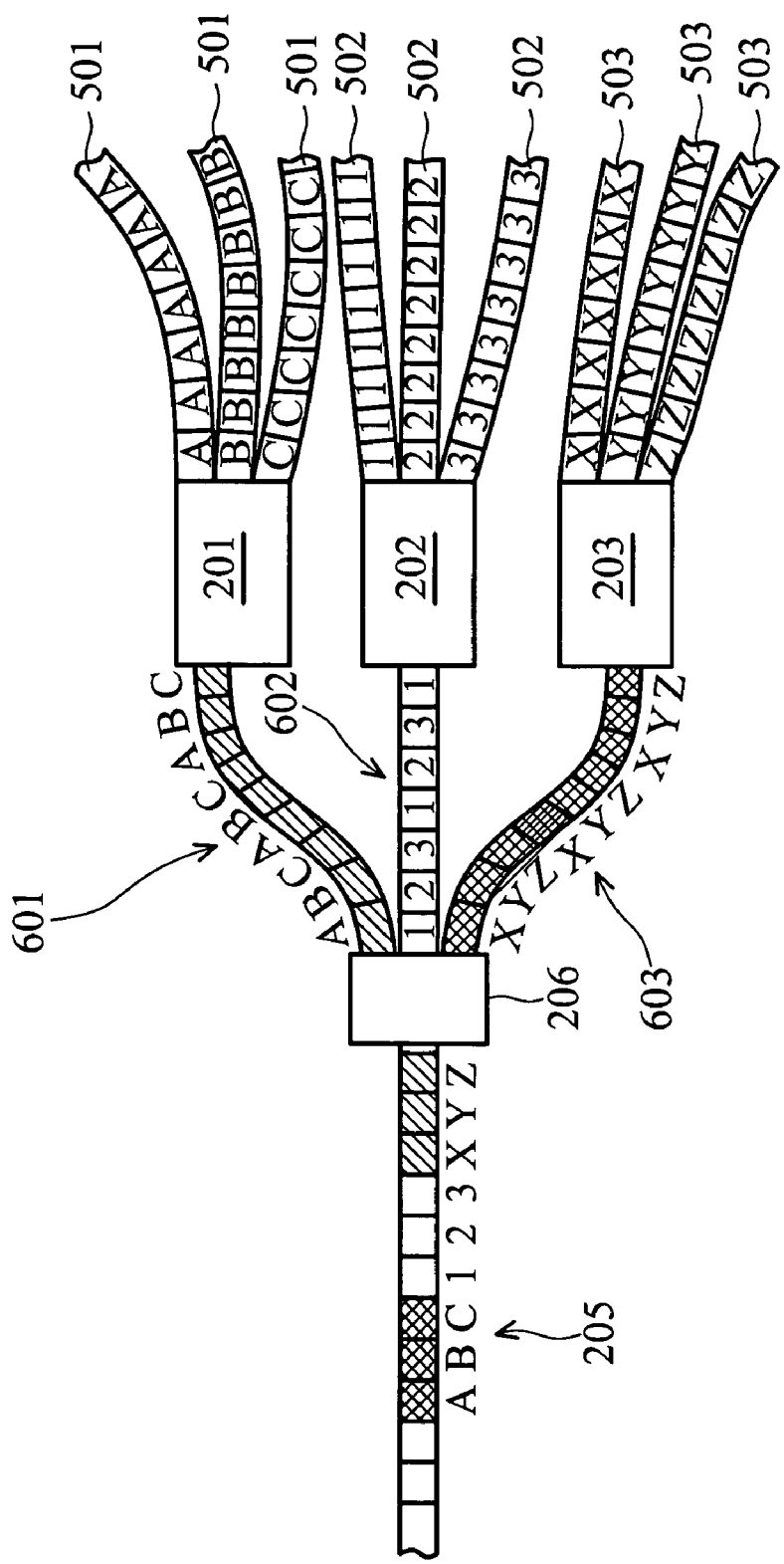
FIG. 5a and FIG. 5b shows stream decryption.
Figure 5B:
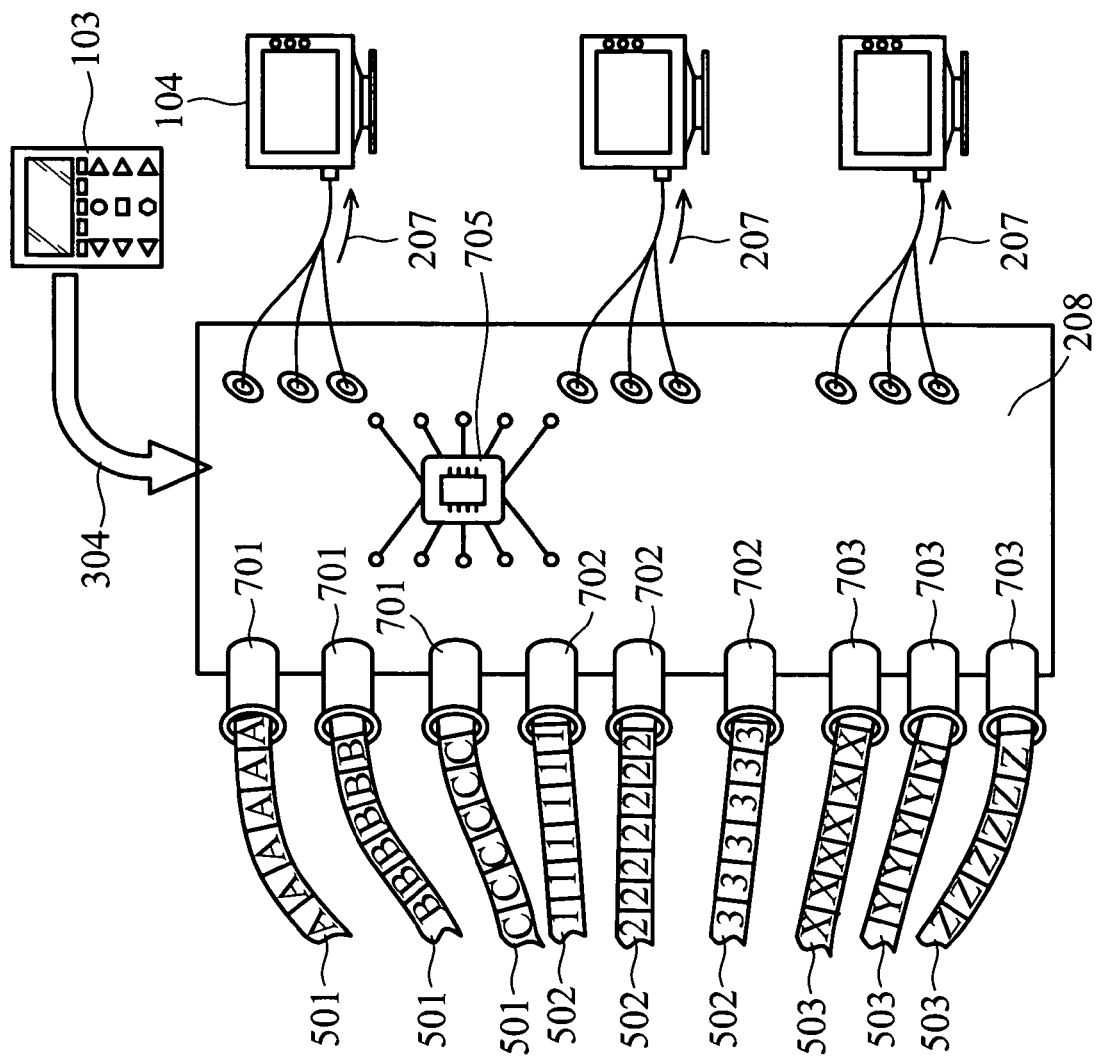

FIG. 5a and FIG. 5b shows the entire stream process. An original stream 205 is decrypted in stream engine 206, the generated video stream 601, audio stream 602 and subtitle stream 603 are then further decoded by video decoder 201, audio decoder 202 and subtitle decoder 203, obtaining video sub-stream 501, audio sub-stream 502 and subtitle sub-stream 503. In FIG. 5b, a plurality of video channel 701, audio channel 702 and subtitle channel 703 are provided for receiving video sub-stream 501, audio sub-stream 502 and subtitle sub-stream 503. The streams are recombined in the multiplexer 208, through selection of one of video channels 701, one of audio channels 702 and one of subtitle channels 703 according to the collected playback parameters 304, and corresponding output streams 207 are generated and synchronously output to client terminal 104, from which the collected playback parameters 304 originated. In practice, the multiplexer 208 may comprise four video channels 701; thirty two audio channels 702 and eight subtitle channels 703, according to DVD specifications, and the stream engine 705 can be a chip or switch for switching electronic signals.

In another embodiment of the invention, the output interface 107 can be an RF node, an AV node, a RGB node or a digital video interface (DVI) node. The number of output interface 107 depends on the viewers. For example, a bus may require 20 nodes while a plane require as many as 400.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for synchronous multiple client service by one DVD player, the method comprises:
providing, by the one DVD player, a plurality of output interfaces corresponding to a plurality of client terminals, respectively;
providing a selection panel for reception of sets of playback parameters from the client terminals, wherein each client terminal issues one set of the sets of playback parameters and each set of playback parameters provides:
a video option for selecting view angles;
an audio option for selecting spoken languages;
a subtitle option for selecting subtitle languages;
decrypting an original stream into a video stream, an audio stream and a subtitle stream;
decoding the video stream into video sub-streams of different view angles, the audio stream into audio sub-streams of various languages, and the subtitle stream into subtitle sub-streams of various languages; and
generating a plurality of output streams to be transmitted to the client terminals, respectively, via the corresponding output interfaces, wherein each output stream is generated by combining one of the video sub-streams, one of the audio sub-streams and one of the subtitle sub-streams based on the set of playback parameters issued from the corresponding client terminal and entered via the selection panel.

2. The method as claimed in claim 1, wherein the original stream is obtained from a DVD.

3. A multiplex DVD player for synchronous multiple client service, comprising:
a plurality of output interfaces corresponding to a plurality of client terminals, respectively;
an selection panel for reception of sets of playback parameters from the client terminals, wherein each of the client terminal issues one set of the sets of playback parameters and each set of the playback parameters provides:
a video option for selecting view angles;
an audio option for selecting spoken languages;
a subtitle option for selecting subtitle languages;
a decoder for decrypting an original stream to obtain a video stream comprising video sub-streams of different view angles, an audio stream comprising audio sub-streams of various languages, and a subtitle stream comprising subtitle sub-streams of various languages; and
a multiplexer generating a plurality of output streams to be transmitted to the client terminals, respectively, via the corresponding output interfaces, wherein the multiplexer generates each output stream by combining one of the video sub-streams, one of the audio sub-streams and one of the subtitle sub-streams based on the set of playback parameters issued from the corresponding client terminal and entered via the selection panel, wherein the multiplex DVD player is a single DVD player.

4. The multiplex DVD player as claimed in claim 3, further comprising a DVD reader for reading the original stream from a DVD.

5. The multiplex DVD player as claimed in claim 3, wherein the output interfaces are RF, AV, RGB or DVI interfaces.

6. The multiplex DVD player as claimed in claim 3, wherein the multiplexer comprises:
a plurality of input channels for receiving the video sub-streams, the audio sub-streams and the subtitle sub-streams; and
a stream engine for generating each of the output streams by selecting and combining one of the video sub-streams, one the audio sub-streams and one of the subtitle sub-streams based on corresponding set of playback parameters.

* * * * *